US011755877B2

(12) United States Patent
Bergman et al.

(10) Patent No.: US 11,755,877 B2
(45) Date of Patent: Sep. 12, 2023

(54) RADIO FREQUENCY IDENTIFICATION (RFID) TAG WITH DEACTIVATABLE LINK

(71) Applicant: Sensormatic Electronics, LLC, Boca Raton, FL (US)

(72) Inventors: Adam S. Bergman, Boca Raton, FL (US); Patrick O'Leary, Lansdale, PA (US); George H. West, Boca Raton, FL (US); Ryan D. Zelaya, Boca Raton, FL (US); Terry S. Will, Masrinette, WI (US); Steve E. Trivelpiece, Rancho Santa Margarita, CA (US); Thomas P. Solaski, Boca Raton, FL (US); Wing K. Ho, Boynton Beach, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 191 days.

(21) Appl. No.: 17/153,517

(22) Filed: Jan. 20, 2021

(65) Prior Publication Data

US 2022/0230040 A1 Jul. 21, 2022

(51) Int. Cl.
*G06K 19/077* (2006.01)

(52) U.S. Cl.
CPC .............. *G06K 19/07773* (2013.01)

(58) Field of Classification Search
CPC .............. G06K 19/07773; G08B 13/242
See application file for complete search history.

(56) References Cited

U.S. PATENT DOCUMENTS

| 4,922,370 A * | 5/1990 | Mulshine ................ H02H 3/08 361/111 |
| 6,025,780 A | 2/2000 | Bowers et al. |
| 7,109,867 B2 | 9/2006 | Forster |
| 2011/0057751 A1* | 3/2011 | Feil .................... H01H 71/2454 335/205 |
| 2011/0254665 A1* | 10/2011 | Lindsay ........... G06K 19/07345 340/10.5 |
| 2016/0321894 A1* | 11/2016 | Schneider ............ G08B 13/242 |
| 2018/0331414 A1* | 11/2018 | Tunnell .................... H01Q 7/08 |
| 2022/0254236 A1* | 8/2022 | Soto .................... G08B 13/2422 |

FOREIGN PATENT DOCUMENTS

| DE | 19749213 A1 | 5/1999 |
| EP | 1743282 A1 | 1/2007 |

OTHER PUBLICATIONS

International Search Report and Written Opinion for International Patent Application No. PCT/US2022/070218, dated Apr. 21, 2022 (99 pages).

\* cited by examiner

*Primary Examiner* — Sonji N Johnson
(74) *Attorney, Agent, or Firm* — ARENTFOX SCHIFF LLP

(57) ABSTRACT

An electronic article surveillance ("EAS") tag for an EAS system, comprising an antenna, a radio frequency identification ("RFID") chip configured to transmit and/or receive a wireless signal via the antenna; and a magnetically-actuatable switch configured to move between a first position and a second position. The switch is configured to electrically couple the RFID chip to the antenna in the first position. The switch is further configured to electrically decouple the RFID chip from the antenna in the second position.

10 Claims, 10 Drawing Sheets

RADIO FREQUENCY IDENTIFICATION (RFID) TAG WITH DEACTIVATABLE LINK

BACKGROUND

Technical Field

The present disclosure relates generally to Electronic Article Surveillance ("EAS"), and more particularly, to examples related to EAS using a Radio Frequency Identification ("RFID") tag with a deactivatable link.

Introduction

EAS systems are used to control inventory and to prevent or deter theft or unauthorized removal of articles from a controlled area. Such systems establish an electromagnetic field or "interrogation zone" that defines a surveillance zone (for example, entrances and/or exits in retail stores) encompassing the controlled area. The articles to be protected are tagged with an EAS security tag. Tags are designed to interact with the field in the interrogation zone, e.g., established by an EAS portal. The EAS portal includes one or more EAS readers (e.g., transmitter/receiver, antennas), and an EAS detection module/controller. The presence of a tag in the interrogation zone is detected by the system and appropriate action is taken. In most cases, the appropriate action includes the activation of an alarm.

In the retail industry, it is common to "source tag" articles with RFID tags, either at the time of packaging/manufacture, or at some other point in the supply chain. At the same time, EAS technology and devices have proven critical to the reduction of theft and so called "shrinkage." Since many articles arrive at the retailer with RFID tags, it is desirable that RFID tags be used also to provide EAS functionality in addition to their intended function of providing capabilities such as inventory control, shelf reading, non-line of sight reading, etc.

In some implementations, an RFID tag can be used to simulate EAS functionality by sending special codes when a reader interrogates the RFID tag. This arrangement advantageously eliminates the need for a separate EAS component, such as an acousto-magnetic ("AM") component, within the tag, or a separate EAS tag. Various schemes can be used to enable the use of RFID tags to simulate EAS functionality. In some such systems, the RFID tag indicates in some way that the item to which the tag is attached has been purchased at point of sale ("POS"). If the RFID tag is a detachable tag, the RFID tag can be simply detached at the point of sale. In such a system, the RFID readers at the exit would trigger an alarm if any tags are detected. In some such systems, data is written to the RFID chip at the POS to confirm the item was purchased. One common method is encoding a bit-flip at the POS, with the changed bit indicating that the item is authorized for removal. Other systems may read a unique ID from the tag, and store the unique ID in the enterprise system when the tagged item is purchased, so that the purchase can be verified by RFID readers as the tag exits the premises. If the purchase of the item cannot be verified based on tag data when the tag passes out of the store, an alarm can be triggered.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes an EAS tag comprising an antenna, an RFID chip configured to transmit and/or receive a wireless signal via the antenna, and a magnetically-actuatable switch. The magnetically-actuatable switch is configured to move between a first position and a second position. The switch is further configured to electrically couple the RFID chip to the antenna in the first position. Additionally, the switch is further configured to electrically decouple the RFID chip from the antenna in the second position.

Another example implementation includes an EAS tag comprising a circuit board, an electrically conductive trace formed on the circuit board and configured to define an antenna, an RFID chip mounted on the circuit board and electrically coupled to the antenna, a magnetic or dielectric layer disposed on the circuit board, and a field modulated layer disposed on the circuit board and having a first property and a second property. The RFID chip is configured to transmit and/or receive a wireless signal via the antenna. The first property of the field modulated layer interacts with the magnetic or dielectric layer and the antenna to enable the RFID chip to transmit and/or receive the wireless signal. The second property of the field modulated layer interacts with the magnetic or dielectric layer and the antenna to disable the RFID chip to transmit and/or receive the wireless signal.

Another example implementation includes an EAS tag comprising an antenna, an RFID chip configured to transmit and/or receive a wireless signal via the antenna, and a radio frequency-actuatable switch disposed between the antenna and the RFID chip. The switch is configured to electrically couple the RFID chip to the antenna in a first state. The switch is further configured to electrically decouple the RFID chip to the antenna in a second state.

Another example implementation includes a method for operating an EAS tag, comprising performing, by a communication element of the EAS tag using an antenna of the EAS tag, communication operations with an EAS system based on a movable switch of the EAS tag being in a first position that electrically couples the communication element to the antenna. The method further includes preventing the communication element from performing the communication operations with the EAS system by changing a position of the movable switch from the first position to a second position that electrically decouples the communication element from the antenna.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
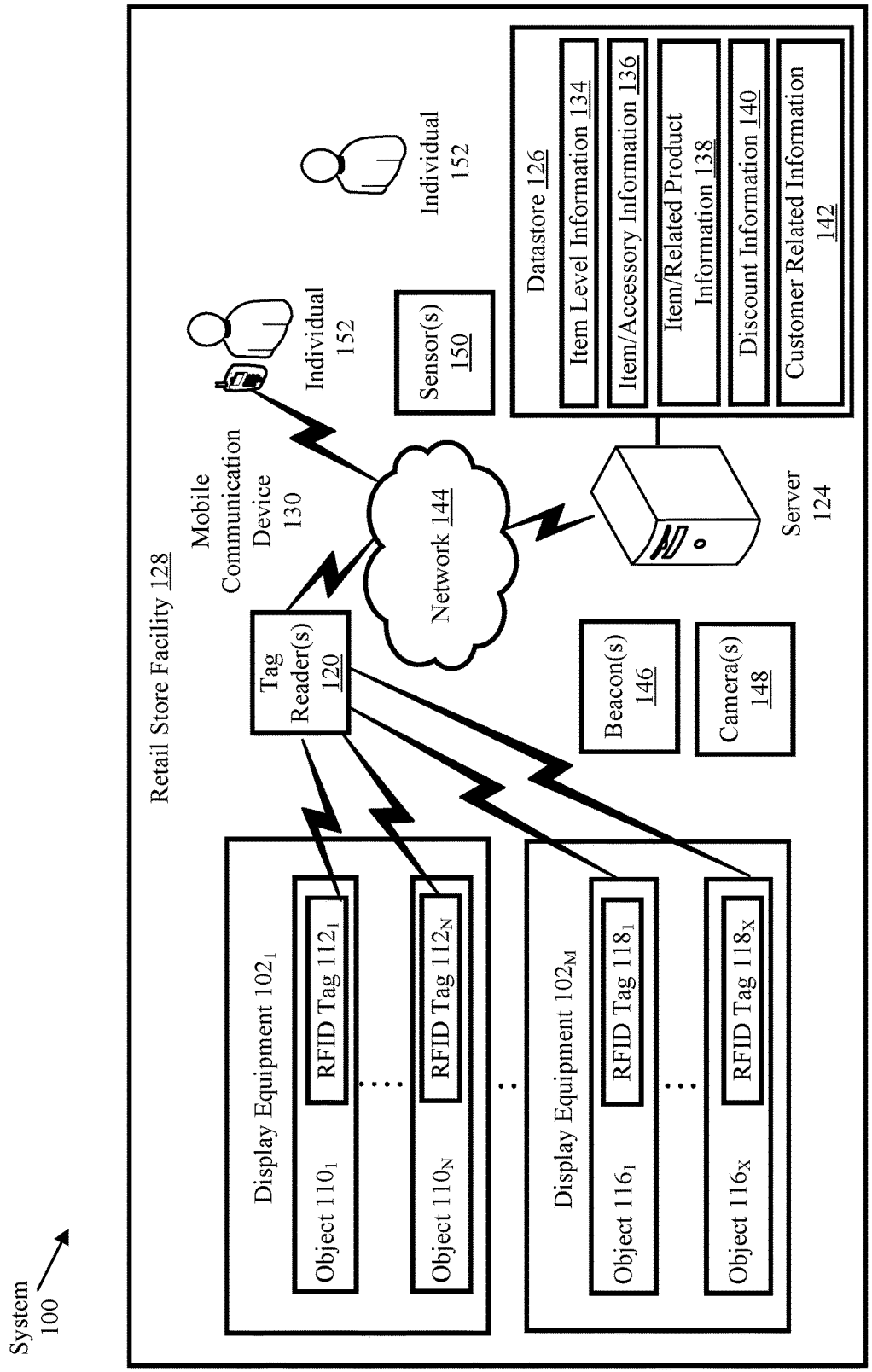
FIG. 1 is a diagram of an illustrative architecture for a system, in accordance with various aspects of the present disclosure.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure, but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect.

Furthermore, the described features, advantages, and characteristics of the present solution may be combined in any suitable manner in one or more aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect", "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A POS device in a conventional EAS system may communicate with an RFID tag to deactivate the RFID chip of the RFID tag to confirm that the item associated with the RFID tag is authorized for removal from a premise (e.g., a retail store facility). For example, the POS device may communicate with the RFID tag and cause the RFID chip to enter into an unrecoverable deactivated state. That is, the RFID chip may not be re-activated after entering the unrecoverable deactivated state. In another example, the POS device may communicate with the RFID tag and cause the RFID chip to enter into a recoverable deactivated state. For example, the RFID chip may be returned to an active state after providing a password or other code value(s). In yet another example, the POS device may deactivate the RFID chip by modifying a signal reception parameter or configuration of the RFID chip (e.g., signal sensitivity) such that the RFID chip may be unable to receive RF signals. As such, the modified RFID chip may behave in a manner similar to a deactivated RFID chip in that the modified RFID chip may not respond to RF signals. In some aspects, the modified RFID chip may be able to receive RF signals only if or when a transmitting antenna is in very close proximity to, or in contact with, the RFID tag. However, conventional processes to deactivate the RFID chip may take several hundred milliseconds to complete, or may take longer than one second if or when the process needs to be restarted or retried. Such conventional EAS systems may not be practical for a retail store facility given the time delay introduced by the deactivation process. For example, such time delays may negatively impact a purchasing experience by requiring that each to-be-purchased item be held for a second or more at a POS device, rather than quickly passing the items across a scanner.

Alternatively or additionally, a conventional EAS system may electronically acknowledge that an item has been purchased at the POS and transmit a signal over a network to an exit system to prevent triggering of an alarm. For example, a unique ID from the RFID tag may be read and stored such that the purchase can be verified by RFID readers as the RFID tag exits the premises. As such, the exit system may not trigger an alarm as the purchased item is taken out of the retail store facility. However, a conventional EAS system may suffer from false alarms due to network issues, such as network lag, or other complexities. In addition, another EAS system at another retail store facility may not be aware of the purchase and may trigger an alarm if or when the purchased item is returned to that retail store facility.

Examples of the technology disclosed herein provide for multiple manners to deactivate an RFID tag at a POS by deactivating a link between the RFID chip and an antenna. In certain aspects, the RFID tag may comprise a switch configured to electrically couple and/or decouple the RFID chip of the RFID tag to the antenna of the RFID tag. Further, aspects presented herein may reduce complexity and may reduce scanning time delays over conventional EAS systems.

These and other features of the present disclosure are discussed in detail below with regard to FIGS. 1-12.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items/articles need to be located and/or tracked.

The system 100 is generally configured to allow (a) improved inventory counts and surveillance of objects and/or items/articles located within a facility, and (b) improved customer experiences. As shown in FIG. 1, system 100 comprises a Retail Store Facility ("RSF") 128 in which display equipment $102_1$-$102_M$ is disposed. The display equipment is provided for displaying objects (or items/articles) $110_1$-$110_N$, $116_1$-$116_X$ to customers of the retail store. The display equipment can include, but is not limited to, shelves, article display cabinets, promotional displays, fixtures, and/or equipment securing areas of the RSF 128. The RSF 128 can also include emergency equipment (not shown), checkout counters, and other equipment and fixtures typical for the facility type. Emergency equipment, checkout counters, video cameras, people counters, and conventional EAS systems are well known in the art, and therefore may not be described at a sufficient level of detail herein for understanding of the claimed invention.

At least one tag reader 120 is provided to assist in counting and tracking locations the articles $110_1$-$110_N$, $116_1$-$116_X$ within the RSF 128. The tag reader 120 comprises an RFID reader configured to read RFID tags. RFID readers are well known in the art, and therefore will be described at a sufficient level of detail herein for understanding of the claimed invention.

RFID tags $112_1$-$112_N$, $118_1$-$118_X$ (hereinafter "112," generally) are respectively attached or coupled to the articles $110_1$-$110_N$, $116_1$-$116_X$ (hereinafter "110," generally). This coupling can be achieved via an adhesive (e.g., glue, tape, or sticker), a mechanical coupler (e.g., straps, clamps, snaps, etc.), a weld, chemical bond, or other means. The RFID tags 112 can alternatively or additionally comprise dual-technology tags that have both EAS and RFID capabilities as described herein.

Notably, the tag reader 120 is strategically placed at a known location within the RSF 128, for example, at an exit/entrance. By correlating the tag reader's RFID tag reads and the tag reader's known location within the RSF 128, it is possible to determine the general location of articles 110 within the RSF 128. The tag reader's known coverage area also facilitates article 110 location determinations. Accordingly, RFID tag read information and tag reader 120 location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags 112 from the articles 110; and/or facilitate the detachment of an anchored chain or cable from the articles 110.

The MCD 130 is generally configured to provide a visual and/or auditory output of item/article level information 134, accessory information 136, related product information 138, discount information 140, and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item/article (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product/article that can be used in conjunction with or as an alternative to another product/article (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for an article/product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount information can be output in a format selected from a plurality of formats based on a geographic location of the item/article 110, a location of the MCD, a date, and/or an item pricing status (i.e., whether the item/article is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags 112. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags 112, and/or MCD 130; perform language and currency conversion operations using item level information and/or accessory information obtained from the datastore, RFID tags 112, and/or MCD; perform data analytics based on inventory information, tag read information, MCD tracking information, and/or information 134-142; perform image processing using images captured by camera(s) 148; and/or determine locations of RFID tags 112 and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112 response to the second RF signal is analyzed and compared to data collected by the RFID signal response that occurred concurrently with tag 112 passage through the portal.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag 112, and/or in response to any motion or movement of the RFID tag 112. For example, if a certain product/article is placed on sale, then the sale price for that product/article is transmitted to MCD 130 via network 144 and/or RFID tag 112. The sale price is then output from the MCD 130. The present solution is not limited to the particulars of this example.

Although a single MCD 130 and/or a single server 124 are shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag 112 or item 110 related information and/or customer related information (e.g., mobile device identifier, mobile device 130 location in RSF 128, and/or customer loyalty level). Tag 112 or item level information includes, but is not limited to, first information indicating that an RFID tag 112 is in motion or that an article 110 is being handled by an individual 152, second information indicating a current location of the RFID tag 112 and/or the MCD 130, third information indicating an accessory or related product of the article 110 to which the moving RFID tag 112 is coupled, and/or fourth information indicating the relative locations of the accessory and the moving RFID tag 112 and/or the relative locations of the related article 110 and the moving RFID tag 112. The first, second and fourth information can be derived based on sensor data generated by sensors local to the RFID tag 112. Accordingly, the RFID tags 112 include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tags 112 or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an article 110 to which an RFID tag 112 is coupled, (d) determination that an RFID tag 112 is being handled or moved by the individual 152 based on a time stamped pattern of MCD movement and a timestamped pattern of RFID tag 112 movement, and/or (e) determination of an association of moving RFID tags 112 and the individual 152.

When a detection is made that an RFID tag 112 is being moved, the server 124 can, in some scenarios, obtain customer related information (such as a loyalty level) 142 associated with the individual. This information can be obtained from the individual's MCD 130 and/or the datastore 126. The customer related information 142 is then used to retrieve discount information 140 for the article 110 to which the RFID tag 112 is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag 112 detects when an individual is handling the article 110 to which the RFID tag 112 is coupled. When such a detection is made, the RFID tag 112 retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the article 110, the server 124 uses the item level information 134 to determine one or more characteristics of the article 110. For example, the article 110 includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Retail store facility 128 can also include sensors 150, such as video sensors, audio sensors, thermal sensors, infrared sensors, people counters, and radar sensors.

Figure 2:
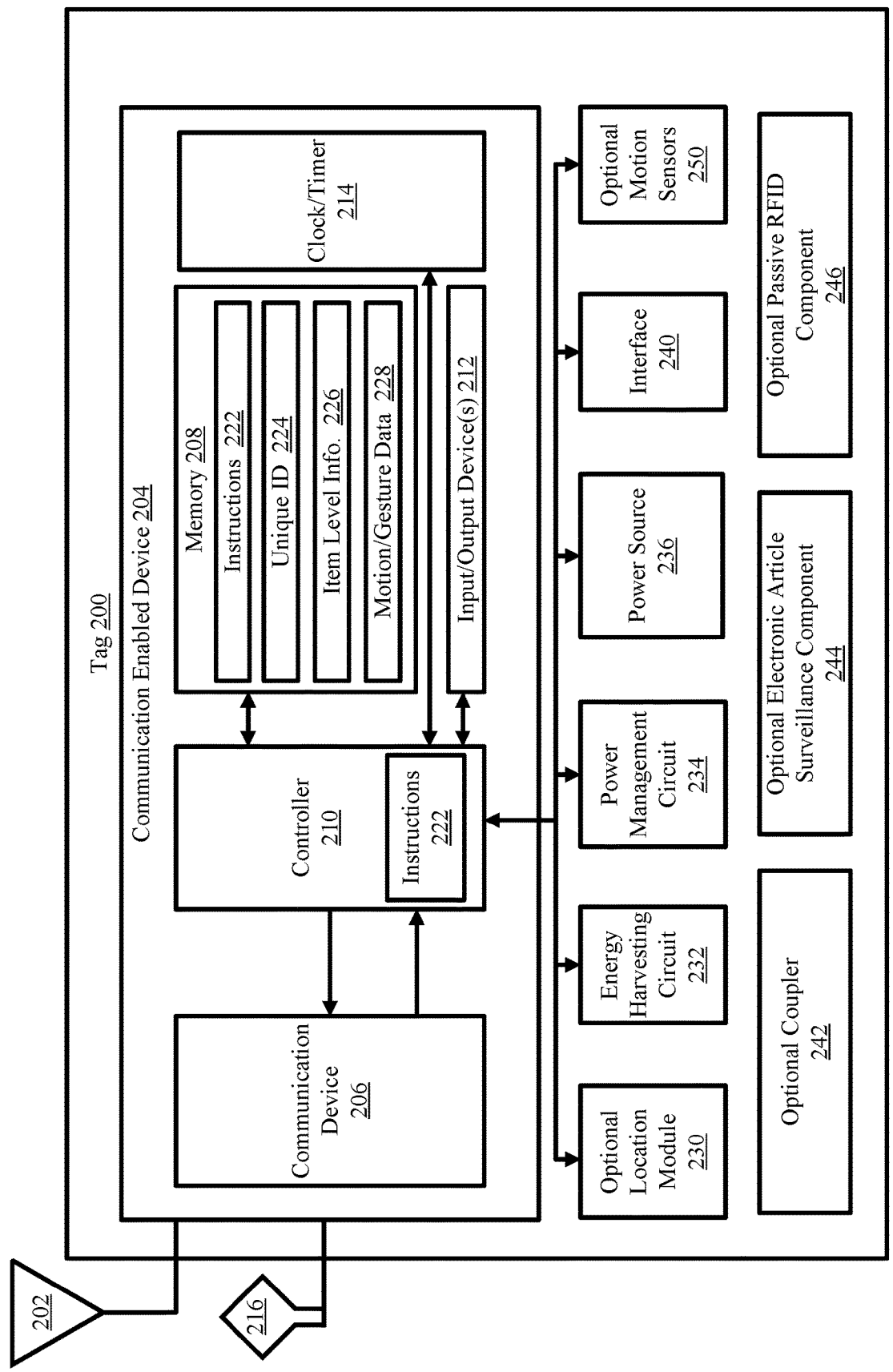
FIG. 2 is a diagram of an illustrative architecture for a tag, in accordance with various aspects of the present disclosure.

Referring now to FIG. 2, there is an illustration of an illustrative architecture for a tag 200. RFID tags $112_1$-$112_N$, $118_1$-$118_X$ are the same as or similar to tag 200. As such, the discussion of tag 200 is sufficient for understanding the RFID tags $112_1$-$112_N$, $118_1$-$118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative aspect implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., a tag reader 120 of FIG. 1, a beacon 146 of FIG. 1, an MCD 130 of FIG. 1, and/or a server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies are employed: Radio Frequency ("RF") communication technology; Bluetooth technology (including Bluetooth Low Energy ("BLE")); Wireless Fidelity ("WiFi") technology; beacon technology; and/or Light Fidelity ("LiFi") technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and may include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR", not shown). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 can comprise a near-field or far-field antenna. The antenna 202, 216 include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, and location and/or tracking of an item (e.g., article 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 or tag reader 300 of FIG. 3 described below, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item/article 110, item description, item price, a currency symbol and/or location information to an external device. The external device (e.g., server 124, server 400 described below, or MCD 130) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices 212 can include, but are not limited to, a display (e.g., an E Ink display, an LCD display, and/or an active matrix display), a speaker, a keypad, and/or light emitting diodes. The display may be used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item/article 110 to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to couple the tag 200 securely or removably to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional EAS component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device 200 can continue to charge despite the depletion of a source of energy. Energy harvesting circuits are well known in the art, and therefore will not be described herein. Any known or to be known energy harvesting circuit 232 can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag 200 transition from a sleep state in response to expiration of a defined time period, tag 200 reception of a control signal from an external device, and/or tag 200 detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag 200 electronics based on the energy source's status. For example, if harvested energy is sufficient to run the tag 200 functions, the power management circuit 234 confirms that all of the tag 200 storage sources are fully charged such that the tag 200 electronic components can be run directly from the harvested energy. This ensures that the tag 200 has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s)he can investigate the issue. It may be that other merchandise are obscuring the harvesting source or the tagged article 110 is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
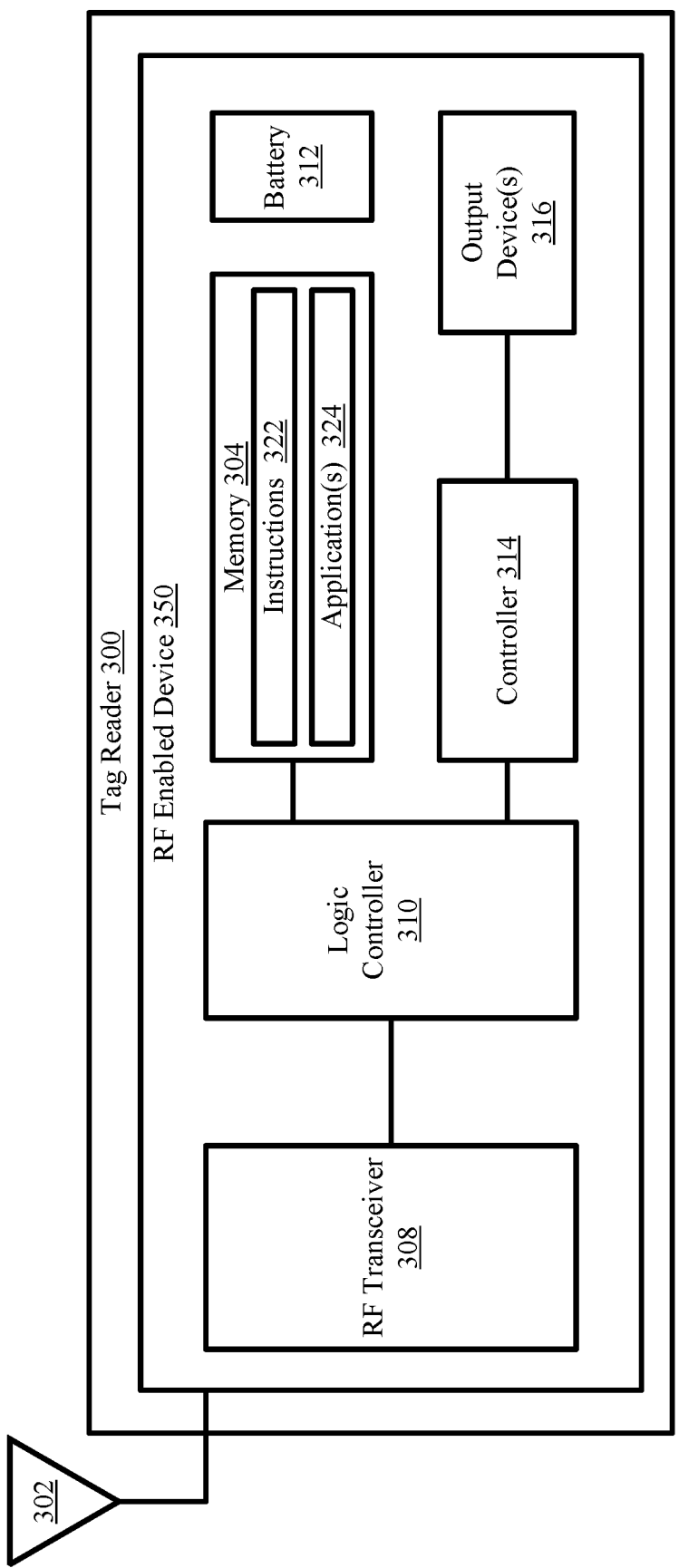
FIG. 3 is a diagram of an illustrative architecture for a tag reader, in accordance with various aspects of the present disclosure.

Referring now to FIG. 3, there is provided a detailed block diagram of an exemplary architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative aspect implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1$-$112_N$, $118_1$-$118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises one or more antennas 302 for allowing data to be exchanged with the external device via RF technology (e.g., RFID technology or other RF based technology). The external device may comprise RFID tags $112_1$-$112_N$, $118_1$-$118_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag 200. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags 200 are present within a facility 128, where the RFID tags 200 are located within a facility 128, which RFID tags 200 are in motion at any given time. Other functions of the RF enabled device 350 will become apparent as the discussion progresses.

Figure 4:
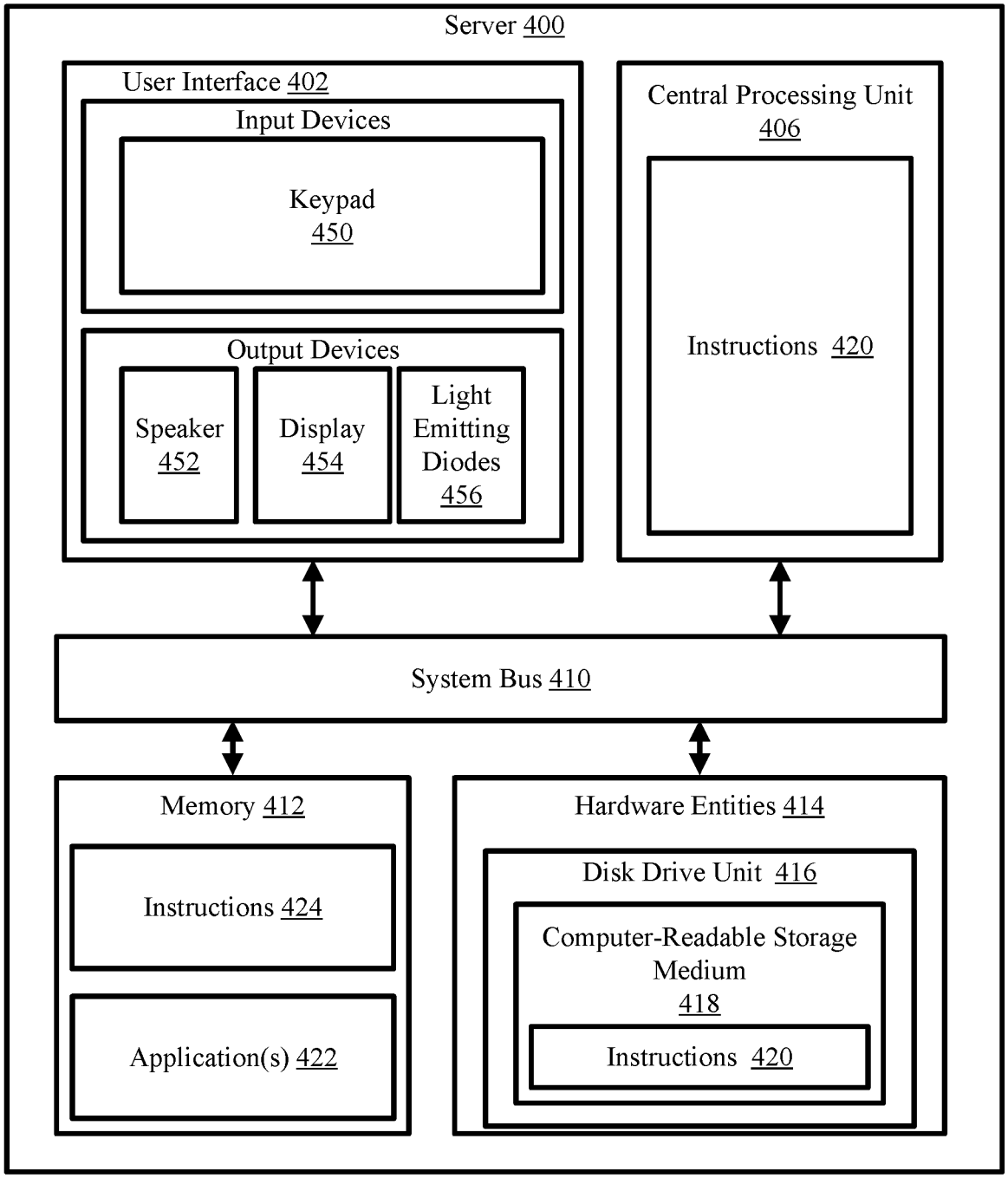
FIG. 4 is a diagram of an illustrative architecture for a server, in accordance with various aspects of the present disclosure.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative aspect implementing the present solution. The hardware architecture of FIG. 4 represents one aspect of a representative server configured to facilitate inventory counts, inventory management, and improved customer experiences.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags 200 within a facility and/or changes to said locations in near real-time. In this regard, it should be understood that the electronic circuit can access and run a software application 422 installed on the server 400. The software application 422 is generally operative to facilitate the determination of RFID tag 200 locations within a facility, the direction of travel of RFID tags 200 in motion, and the mapping of the RFID tag 200 locations and movements in a virtual three-dimensional space.

In those or other scenarios, the hardware entities 414 include an electronic circuit (e.g., a processor) programmed for facilitating item/article inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags 200; program item level information, accessory information, related product information and/or discount information onto RFID tags 200 and/or MCDs; convert the language, pricing and/or currency symbol of item level information, accessory information, related product information and/or discount information; facilitate registration of RFID tags 200 and MCDs with an enterprise system; and/or determine when MCD display update actions need to be taken based on RFID tag 200 information. Other functions of the software applications 422 will become apparent as the discussion progresses. Such other functions can relate to tag reader control and/or tag control.

Figure 5:
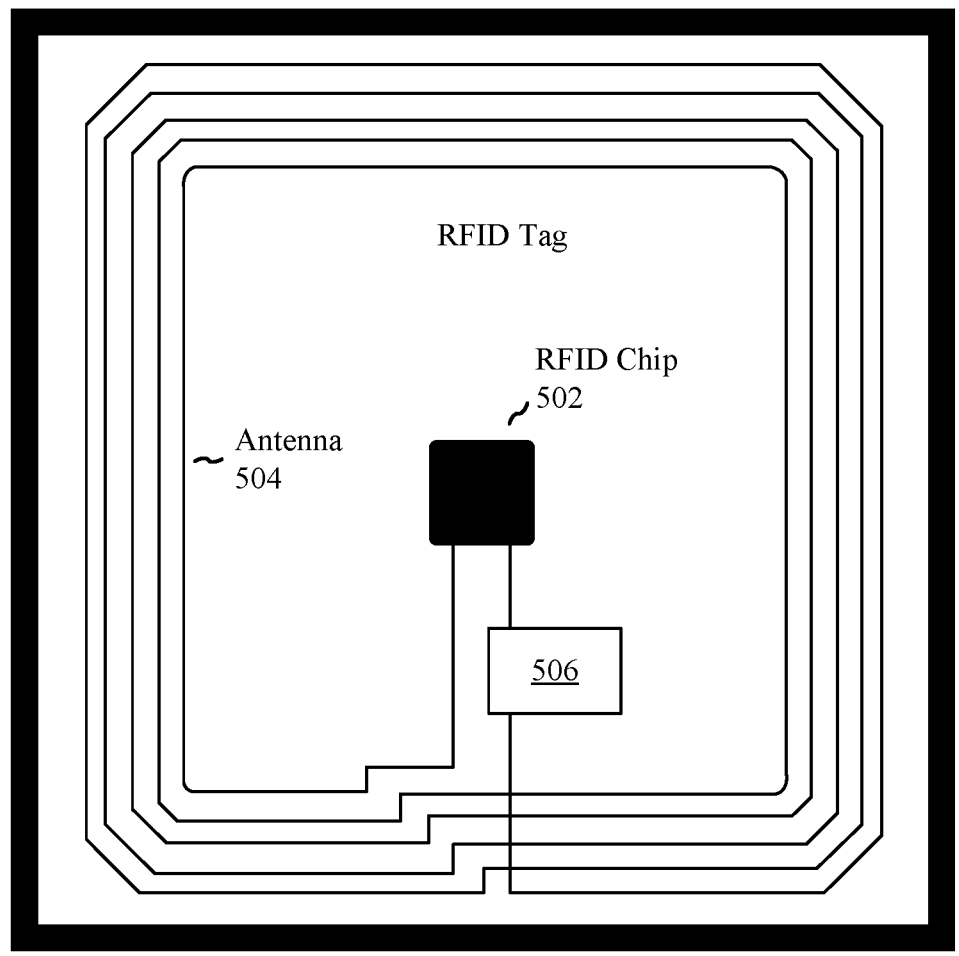
FIG. 5 is an illustration of an example architecture for an RFID tag with a deactivatable link, in accordance with various aspects of the present disclosure.

Referring now to FIG. 5, there is an illustration of an illustrative architecture for an RFID tag 500. RFID tags 112$_1$-112$_N$, 118$_1$-118$_X$ and tag 200 are the same as or similar to RFID tag 500. As such, the discussion of RFID tag 500 is sufficient for understanding the RFID tags 112$_1$-112$_N$, 118$_1$-118$_X$ of FIG. 1 and tag 200 of FIG. 2. Notably, the RFID tag 500 may include more or less components than those shown in FIG. 5. However, the components shown are sufficient to disclose an illustrative aspect implementing the present solution. The hardware architecture of FIG. 5 represents one aspect of a representative tag configured to deactivate an RFID tag by deactivating a link between an RFID chip and an antenna.

The RFID tag 500 may comprise an RFID chip 502 configured to generate and transmit signals for tracking an item, an antenna 504 for receiving and transmitting wireless signals for the RFID chip 502, and a deactivatable link 506 for electrically coupling or decoupling the RFID chip 502 and the antenna 504 to selectively deactivate the RFID tag 500. In some aspects, the RFID tag 500 may comprise a circuit board (not shown) with an electrically conductive trace formed on the circuit board and configured to define the antenna 504. The RFID chip 502 may be mounted on the circuit board of the RFID tag 500.

The RFID chip 502 may be the same as or similar to the communication enabled device 204 of FIG. 2. As such, the discussion of RFID chip 502 is sufficient for understanding the communication enabled device 204 of FIG. 2. The RFID chip 502 may be configured to generate and transmit signals (e.g., RF carrier signals) to external devices via the antenna 504. The RFID chip 502 may be further configured to receive signals (e.g., RF signals) transmitted from external devices via the antenna 504. In this way, the RFID chip 502 may facilitate registration, identification, and location and/or tracking of an item (e.g., article 110 or 112 of FIG. 1) to which the RFID tag 500 is coupled.

Alternatively or additionally, the RFID chip 502 may comply with applicable privacy laws, for example, General Data Protection Regulation ("GDPR"). In some aspects, the RFID chip 502 may be configured to be permanently or temporarily deactivated. For example, the RFID chip 502 may be configured to receive an instruction indicating that the RFID chip 502 enter a permanent or a temporary deactivated state (e.g., a "kill" command). Temporary deactivation of the RFID chip 502 may be reversed by further instructing the RFID chip 502 return to an active state or mode. The RFID chip 502 may require a password and/or other pre-determined value(s) in order to return to the active state or mode. In other aspects, the RFID chip 502 may be configured to modify at least one signal reception parameter or configuration (e.g., signal sensitivity) such that the RFID chip 502 may be unable to further receive signals. In such a scenario, the modified RFID chip 502 may only be able to receive signals if or when a transmitting antenna or external device is in very close proximity to, or in contact with the RFID tag 500. In yet other aspects, the RFID chip 502 may be configured to overwrite or erase at least a portion of data stored on the RFID chip 502 (e.g., set the data values to all zeros). For example, the RFID chip 502 may remain active, however, the RFID chip 502 may return only zero values when queried by an external device.

The antenna 504 may be the same as or similar to antennas 202, 216 of FIG. 2. As such, the discussion of antenna 504 is sufficient for understanding the antennas 202, 216 of FIG. 2. The antenna 504 may be configured to receive signals from external devices and/or transmit signals generated by the RFID chip 502. The antenna 504 may comprise a near-field and/or a far-field antenna. The antenna 504 may be electrically coupled to the RFID chip 502 via the deactivatable link 506.

The deactivatable link 506 may be configured, in a first state, to electrically couple the RFID chip 502 and the antenna 504. That is, the first state of the deactivatable link 506 may enable the RFID chip 502 to transmit and/or receive wireless signals via the antenna 504. The deactivatable link 506 may be further configured, in a second state, to electrically decouple the RFID chip 502 and the antenna 504. That is, the second state of the deactivatable link 506 may disable the RFID chip 502 from transmitting and/or receiving wireless signals via the antenna 504.

In some aspects, the deactivatable link 506 may comprise a magnetically-actuatable switch (discussed in further detail below in reference to FIGS. 6-9) configured to move between a first position and a second position. The first position of the magnetically-actuatable switch may correspond to the first state of the deactivatable link 506. That is, the magnetically-actuatable switch may be configured to electrically couple the RFID chip 502 to the antenna 504 in the first position. The second position of the magnetically-actuatable switch may correspond to the second state of the deactivatable link 506. That is, the magnetically-actuatable switch may be configured to electrically decouple the RFID chip 502 from the antenna 504 in the second position.

Alternatively or additionally, the deactivatable link 506 in the form of the magnetically-actuatable switch may be configured to subsequently change from the second position to the first position. That is, the magnetically-actuatable switch may move from the first position to the second position based on a first application of a first magnetic field. The magnetically-actuatable switch may then subsequently move from the second position to the first position based on a second application of a second magnetic field. Characteristics of the firstly applied magnetic field (e.g., polarity, strength, direction, and the like) may be similar or different to characteristics of the secondly applied magnetic field. For example, the first magnetic field may have a direction that is perpendicular to an axis of motion of the magnetically-actuatable switch and the second magnetic field may have a direction that is parallel to the axis of motion.

In other aspects, the magnetically-actuatable switch may be configured to remain in the second position permanently. That is, if and when the magnetically-actuatable switch moves from the first position to the second position, a subsequent application of a magnetic field may not cause the magnetically-actuatable switch to revert to the first position.

In some aspects, the deactivatable link 506 in the form of the magnetically-actuatable switch, as discussed in further detail below in reference to FIGS. 6-7, may comprise a magnetizable ferromagnetic element configured to move the magnetically-actuatable switch between the first position and the second position based on a magnetization state of the magnetizable ferromagnetic element. That is, the magnetically-actuatable switch may be in the first position if and when the magnetizable ferromagnetic element is in a magnetized state. Alternatively or additionally, the magnetically-actuatable switch may be in the second position if and when the magnetizable ferromagnetic element is in a demagnetized state.

In other aspects, and as discussed in further detail below in reference to FIGS. 8-9, the deactivatable link 506 in the form of the magnetically-actuatable switch may comprise a magnetic shape memory alloy ("MSMA") element configured to move the magnetically-actuatable switch between the first position and the second position based on a magnetic field applied to the MSMA element. That is, the magnetically-actuatable switch may be in the first position if and when the MSMA element is in the first magnetized state. Alternatively or additionally, the magnetically-actuatable switch may be in the second position if and when the MSMA element is in the second magnetized or demagnetized state.

In yet other aspects, the deactivatable link 506 in the form of the magnetically-actuatable switch may comprise a ferrofluid element configured to move the magnetically-actuatable switch between the first position and the second position based on a magnetic field applied to the ferrofluid element. That is, the magnetically-actuatable switch may move from the first position to the second position if and when a magnetic field is applied to the ferrofluid element. Alternatively or additionally, the ferrofluid element may be configured, in a first magnetized state, to electrically couple the RFID chip 502 and the antenna 504. For example, the ferrofluid element may establish an electrical connection between the RFID chip 502 and the antenna 504 if or when the ferrofluid element is in the first magnetized state. The ferrofluid element may be further configured, in a second magnetized or demagnetized state, to electrically decouple the RFID chip 502 and the antenna 504. For example, the ferrofluid element may break the electrical connection between the RFID chip 502 and the antenna 504 if or when the ferrofluid element is in the second magnetized state or the demagnetized state. The deactivatable link 506 may further comprise a cantilever formed from ferromagnetic material to maintain the first and/or second magnetized states of the ferrofluid element.

The ferrofluid element may employ a ferrofluid or a magnetorheological fluid. These types of fluids are liquids that become strongly magnetized in the presence of a magnetic field. In this regard, the ferrofluid may comprise nanoscale ferromagnetic particles (e.g., iron particles) suspended in a carrier fluid (e.g., an oil emulsion). The magnetorheological fluid may comprise particles primarily on the micro-meter scale. Each of these fluids may have two states of matter, namely a solid state and a liquid state. The state of matter of the fluid may change from the liquid state to the solid state with the application of the magnetic field. The rigidity of the fluid in its solid state may depend on the strength of the magnetic field applied thereto. The fluid may lose viscosity if or when the application of the magnetic field application is discontinued. As such, the ferrofluid or the magnetorheological fluid may flow from the first position to the second position while the magnetic field is applied and may stiffen again if and when the magnetic field is no longer applied. Alternatively or additionally, the ferrofluid or the magnetorheological fluid may flow from the second position to the first position while the magnetic field is applied and may stiffen again if and when the magnetic field is no longer applied.

In some aspects, the deactivatable link 506 in the form of the magnetically-actuatable switch may comprise a Reed switch element configured to move the magnetically-actuatable switch between the first position and the second position based on a magnetic field applied to the Reed switch. That is, the magnetically-actuatable switch may be in the first position if and when the Reed switch is in a magnetized state. Alternatively or additionally, the magnetically-actuatable switch may be in the second position if and when the Reed switch is in the demagnetized state. For example, the Reed switch may comprise a control element and/or a switching element. In some aspects, the control element and/or the switching element may comprise a bias magnet (e.g., acousto-magnetic bias).

In other aspects, at least a portion of the deactivatable link 506 in the form of the magnetically-actuatable switch may be in the demagnetized state if or when the magnetically-actuatable switch is in the first position. Alternatively or additionally, the portion of the magnetically-actuatable switch may be in the magnetized state if or when the magnetically-actuatable switch is in the second position.

With further reference to FIG. 5, the deactivatable link 506 may comprise, in other aspects, a radio frequency-actuatable switch disposed between the antenna 504 and the RFID chip 502. The radio frequency-actuatable switch may be configured to electrically couple the RFID chip 502 to the antenna 504 in the first state. Alternatively or additionally, the radio frequency-actuatable switch may be configured to electrically decouple the RFID chip 502 to the antenna 504 in the second state. For example, the radio frequency-actuatable switch may be configured to change from the first state to the second state when a radio frequency signal (e.g., Near Field Communication ("NFC") signal, an RFID signal, or the like) is applied to the RFID tag 500. That is, application of a first radio frequency signal may cause a change in a configuration of the radio frequency-actuatable switch. In some aspects, the radio frequency-actuatable switch may be configured to return to the first state, from the second state, by a subsequent application of a second radio frequency signal. The second radio frequency signal may be similar to or different from the first radio frequency signal.

Referring now to FIGS. 6-10, the diagrams illustrate several examples of deactivatable links (e.g., deactivatable link 506) that may be used for activating and/or deactivating a link between an RFID chip (e.g., RFID chip 502) and an antenna (e.g., antenna 504) of an RFID tag (e.g., RFID tag 500) as described above in reference to FIG. 5.

Figure 6:
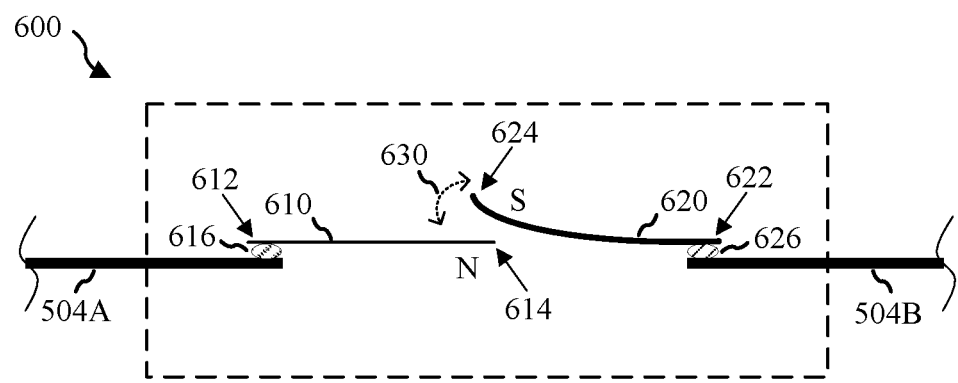
FIG. 6 is a diagram illustrating a first example of a deactivatable link, in accordance with various aspects of the present disclosure.

FIG. 6 provides an illustration of a first example of a deactivatable link. The deactivatable link 600 depicted in FIG. 6 is similar in many respects to the deactivatable link 506 described above with reference to FIG. 5, and may include additional features not mentioned above. As such, the discussion of the deactivatable link 506 is sufficient for understanding the functionality of the deactivatable link 600 of FIG. 6.

The deactivatable link 600, as shown in FIG. 6, may comprise a magnetically-actuatable switch (e.g., elements 610-626) disposed between a first antenna portion 504A and a second antenna portion 504B of an antenna (e.g., antenna 504 of FIG. 5). The deactivatable link 600 in the form of the magnetically-actuatable switch may be configured to move between a first position and a second position based on a magnetization state of the magnetically-actuatable switch. In particular, the magnetically-actuatable switch may comprise a first cantilever member 610 formed from a magnetically soft ferromagnetic material (e.g., permalloy, mu-metal, amorphous metal, and the like) and a second cantilever member 620 formed from at least a magnetically semi-hard ferromagnetic material (e.g., CROVAC, SEMIVAC, and the like). In some aspects, the first cantilever member 610 may be formed from the magnetically semi-hard ferromagnetic material and the second cantilever member 620 may be formed from the magnetically soft ferromagnetic material. In other aspects, the first cantilever member 610 and the second cantilever member 620 may be formed from the magnetically semi-hard ferromagnetic material. A magnetic hardness of the magnetically semi-hard ferromagnetic material (i.e., the larger a magnetic field is needed to magnetize/demagnetize the material, the larger the magnetic hardness of said material) may be determined at least according to a level of a magnetic field applied by a deactivation device so as to achieve ease of deactivation while maintaining security and preventing unauthorized deactivations.

The first cantilever member 610 may have a first end 612 connected and/or electrically coupled to the first antenna trace portion 504A via electrical connection 616. The first cantilever member 610 may have an opposing second end 614. The second cantilever member 620 may have a third end 622 connected and/or electrically coupled to the second antenna trace portion 504B via electrical connection 626. The second cantilever member 620 may have an opposing fourth end 624. The second end 614 may have a first polarity (e.g., north pole) and the fourth end 624 may have an opposite polarity (e.g., south pole), as shown in FIG. 6.

The fourth end 624 may be movably connectable to the second end 614 in a magnetized state of the second cantilever member 620 to define the first position. For example, the fourth end 624 may move along path 630, at least caused by a magnetic attraction between the first polarity of the second end 614 (e.g., north pole) and the opposite polarity of the fourth end 614 (e.g., south pole), to establish a connection (e.g., electrical connection) between the first antenna trace portion 504A and the second antenna trace portion 504B. That is, the magnetically-actuatable switch may be in a closed position if and when the second cantilever member 620 is magnetized. For example, the first position of the deactivatable link 600 may enable the RFID chip 502 to transmit and/or receive wireless signals via the antenna 504.

The fourth end 624 may be movably spaced apart from the second end 614 in a demagnetized state of the second cantilever member 620 to define the second position. For example, the fourth end 624 may move along path 630, in the absence of the magnetic attraction between the second end 614 and the fourth end 624, to break the connection between the first antenna trace portion 504A and the second antenna trace portion 504B. That is, the magnetically-actuatable switch may be in an open position if and when the second cantilever member 620 is demagnetized. For example, the second position of the deactivatable link 600 may disable the RFID chip 502 from transmitting and/or receiving wireless signals via the antenna 504.

In some aspects, the first cantilever member 610 and the second cantilever member 620 may be formed from the first antenna trace portion 504A and the second antenna trace portion 504B, respectively. For example, the first antenna trace portion 504A and the second antenna trace portion 504B may comprise magnetically soft ferromagnetic material and/or magnetically semi-hard ferromagnetic material. That is, the first antenna trace portion 504A and the second antenna trace portion 504B may be made magnetizable by deposition, coating, and/or plating of appropriate ferromagnetic material.

In other aspects, at least some elements of the deactivatable link 600 in the form of the magnetically-actuatable switch may be fixed on a substrate (not shown). For example, the first cantilever member 610, the electrical connection 616, and the electrical connection 626 may be fixed on the substrate, and the second cantilever member 620 may not be fixed on the substrate and allowed to move between the first position and the second position. In yet other aspects, the substrate may be formed on a circuit board (not shown) with an electrically conductive trace formed on the circuit board and configured to define the antenna 504. An RFID chip (e.g., RFID chip 502 of FIG. 5) may be mounted on the circuit board. Alternatively or additionally, the elements of deactivatable link 600 may be miniaturized using micro-electromechanical systems ("MEMS") techniques.

Figure 7:
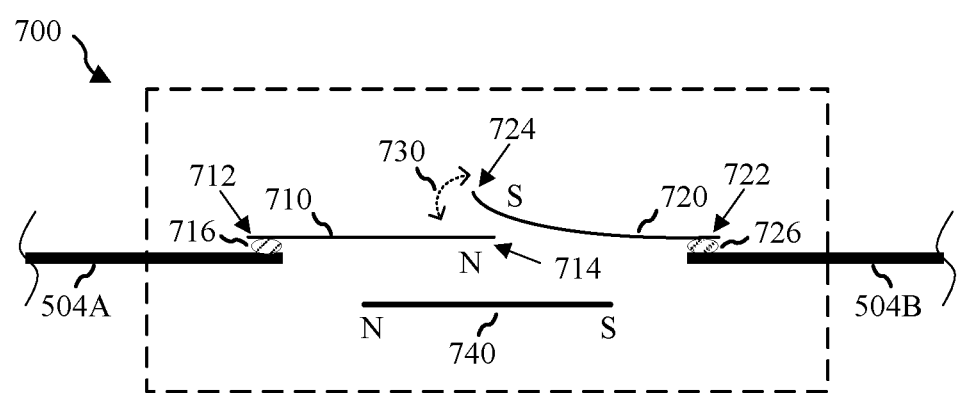
FIG. 7 is an illustration of a second example of a deactivatable link, in accordance with various aspects of the present disclosure.

FIG. 7 illustrates a second exemplary deactivatable link that is similar in many respects to the deactivatable links 506 and 600 described above with reference to FIGS. 5 and 6, respectively, and may include additional features not mentioned above. As such, the discussions of the deactivatable links 506 and 600 are sufficient for understanding the functionality of the deactivatable link 700 of FIG. 7.

The deactivatable link 700, as shown in FIG. 7, may comprise a magnetically-actuatable switch (e.g., elements 710-740) disposed between a first antenna portion 504A and a second antenna portion 504B of an antenna (e.g., antenna 504 of FIG. 5). The deactivatable link 700 in the form of the magnetically-actuatable switch may be configured to move between a first position and a second position based on a magnetization state of the magnetically-actuatable switch. In particular, the magnetically-actuatable switch may comprise a first cantilever member 710, a second cantilever member 720, and a magnetic ribbon member 740. In some aspects, the first cantilever member 710 and the second cantilever member 720 may be formed from a magnetically soft ferromagnetic material (e.g., permalloy, mu-metal, amorphous metal, and the like) and the magnetic ribbon member 740 may be formed from at least a magnetically semi-hard ferromagnetic material (e.g., CROVAC, SEMIVAC, and the like).

The first cantilever member 710 may have a first end 712 connected and/or electrically coupled to the first antenna trace portion 504A via electrical connection 716. The first cantilever member 702 may have an opposing second end 714. The second cantilever member 720 may have a third end 722 connected and/or electrically coupled to the second antenna trace portion 504B via electrical connection 726. The second cantilever member 720 may have an opposing fourth end 724. The second end 714 may have a first polarity (e.g., north pole) and the fourth end 724 may have an opposite polarity (e.g., south pole), as shown in FIG. 7.

The fourth end 724 may be movably connectable to the second end 714 in a magnetized state of the magnetic ribbon member 740 to define the first position. For example, the fourth end 724 may move along path 730, at least caused by a magnetic attraction between the first polarity of the second end 714 (e.g., north pole) and the opposite polarity of the fourth end 714 (e.g., south pole), to establish a connection (e.g., electrical connection) between the first antenna trace portion 504A and the second antenna trace portion 504B. That is, the magnetically-actuatable switch may be in a closed position if and when the magnetic ribbon member 740 is magnetized. For example, the first position of the deactivatable link 700 may enable the RFID chip 502 to transmit and/or receive wireless signals via the antenna 504.

The fourth end 724 may be movably spaced apart from the second end 714 in a demagnetized state of the magnetic ribbon member 740 to define the second position. For example, the fourth end 724 may move along path 730, in the absence of the magnetic attraction between the second end 714 and the fourth end 724, to break the connection between the first antenna trace portion 504A and the second antenna trace portion 504B. That is, the magnetically-actuatable switch may be in an open position if and when the magnetic ribbon member 740 is demagnetized. For example, the second position of the deactivatable link 700 may disable the RFID chip 502 from transmitting and/or receiving wireless signals via the antenna 504.

In some aspects, at least some elements of the deactivatable link 700 in the form of the magnetically-actuatable switch may be fixed on a substrate (not shown). For example, the first cantilever member 710, the electrical connection 716, the electrical connection 726, and the magnetic ribbon member 740 may be fixed on the substrate, and the second cantilever member 720 may not be fixed on the substrate and allowed to move between the first position and the second position. In other aspects, the substrate may be formed on a circuit board (not shown) with an electrically conductive trace formed on the circuit board and configured to define the antenna 504. An RFID chip (e.g., RFID chip 502 of FIG. 5) may be mounted on the circuit board. Alternatively or additionally, the elements of deactivatable link 700 may be miniaturized using micro-electromechanical systems ("MEMS") techniques.

Figure 8:
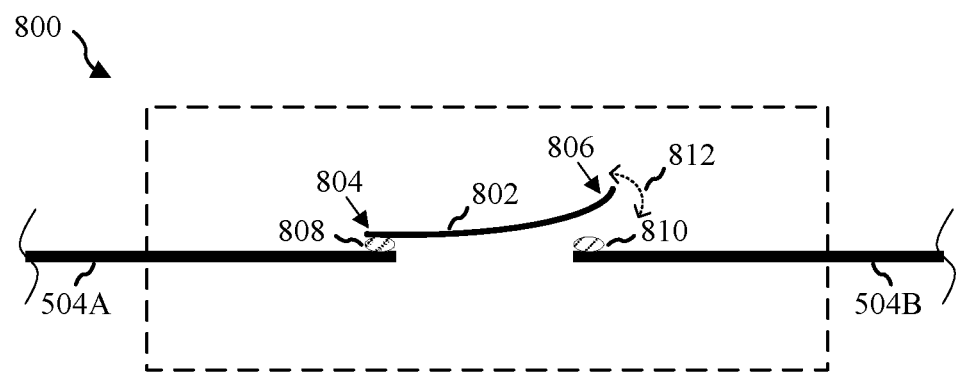
FIG. 8 is a diagram illustrating a third example of a deactivatable link, in accordance with various aspects of the present disclosure.

FIG. 8 illustrates a third exemplary deactivatable link that is similar in many respects to the deactivatable links 506, 600, and 700 described above with reference to FIGS. 5-7, respectively, and may include additional features not mentioned above. As such, the discussions of the deactivatable links 506, 600, and 700 are sufficient for understanding the functionality of the deactivatable link 800 of FIG. 8.

The deactivatable link 800, as shown in FIG. 8, may comprise a magnetically-actuatable switch (e.g., elements 802-810) disposed between a first antenna portion 504A and a second antenna portion 504B of an antenna (e.g., antenna 504 of FIG. 5). The deactivatable link 800 in the form of the magnetically-actuatable switch may be configured to move between a first position and a second position based on a magnetization state of the magnetically-actuatable switch. In particular, the magnetically-actuatable switch may comprise a cantilever member 802 that may be formed from a MSMA. That is, the cantilever member 802 may be formed from a nickel-manganese-gallium alloy (NiMnGa), a MSMA composite, a MSMA multi-layer ribbon, strip, or wire, or the like. In some aspects, a cantilever form factor and/or a lamination distribution of the MSMA may be determined based at least on a deformation characteristic of a resulting cantilever member 802.

The cantilever member 802 may have a first end 804 connected and/or electrically coupled to the first antenna trace portion 504A via electrical connection 808. The cantilever member 802 may have an opposing second end 806. The second end 806 may be movably connectable to the second antenna trace portion 504B via electrical connection 810 in a magnetized state of the cantilever member 802 to define the first position. For example, the cantilever member 802 may exhibit deformation (e.g., strain deformation) if and when the cantilever member 802 is subjected to a magnetic field and/or the cantilever member 802 is in the magnetized state. The deformation of the cantilever member 802 may move the second end 806 of the cantilever member 802 to the first position. For example, the second end 806 may move along path 812, at least caused by the deformation of the cantilever member 802, to establish a connection (e.g., electrical connection) between the first antenna trace portion 504A and the second antenna trace portion 504B. In some aspects, the cantilever member 802 may be moved to the first position upon application of a magnetic field in a particular direction. For example, the cantilever member 802 may be moved to the first position by applying a magnetic field in a direction that is parallel to the axis of motion. The first position of the deactivatable link 800 may enable the RFID chip 502 to transmit and/or receive wireless signals via the antenna 504. That is, the magnetically-actuatable switch may be in a closed position if and when the cantilever member 802 is magnetized.

The second end 806 of the cantilever member 802 may be movably spaced apart from the second antenna trace portion 504B in a second magnetized or demagnetized state of the cantilever member 802 to define the second position. For example, the second end 806 may move along path 812 to break the connection between the first antenna trace portion 504A and the second antenna trace portion 504B. In some aspects, the deformation of the cantilever member 802 may be reversed if and when the cantilever member 802 is demagnetized and/or the cantilever member 802 is subjected to another magnetic field. In other aspects, the cantilever member 802 may be moved to the second position upon application of a magnetic field in a different direction. For example, the cantilever member 802 may be moved to the second position by applying a magnetic field in a direction that is perpendicular to the axis of motion. The second position of the deactivatable link 800 may disable the RFID chip 502 from transmitting and/or receiving wireless signals via the antenna 504. That is, the magnetically-actuatable switch may be in an open position if and when the cantilever member 802 is demagnetized.

The cantilever member 802 may remain in its current position if and when the magnetic field is no longer applied. Alternatively or additionally, the deformation of the cantilever member 802 may be reversible or may be permanent. That is, the position of the cantilever member 802 may be or may not be subsequently changed by a subsequent application of another magnetic field.

Figure 9:
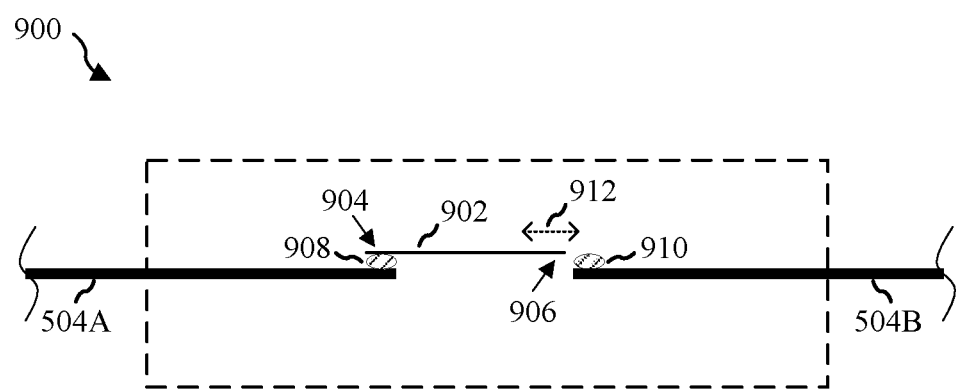
FIG. 9 is an illustration of a fourth example of a deactivatable link, in accordance with various aspects of the present disclosure.

FIG. 9 illustrates a fourth exemplary deactivatable link that is similar in many respects to the deactivatable links 506, 600, 700, and 800 described above with reference to FIGS. 5-8, respectively, and may include additional features not mentioned above. As such, the discussions of the deactivatable links 506, 600, 700, and 800 are sufficient for understanding the functionality of the deactivatable link 900 of FIG. 9.

The deactivatable link 900, as shown in FIG. 9, may comprise a magnetically-actuatable switch (e.g., elements 902-910) disposed between a first antenna portion 504A and a second antenna portion 504B of an antenna (e.g., antenna 504 of FIG. 5). The deactivatable link 900 in the form of the magnetically-actuatable switch may be configured to move between a first position and a second position based on a magnetization state of the magnetically-actuatable switch. In particular, the magnetically-actuatable switch may comprise a cantilever member 902 that may be formed from a MSMA. That is, the cantilever member 902 may be formed from a nickel-manganese-gallium alloy (NiMnGa), a MSMA composite, a MSMA multi-layer ribbon, strip, or wire, or the like.

The cantilever member 902 may have a first end 904 connected and/or electrically coupled to the first antenna trace portion 504A via electrical connection 908. The cantilever member 902 may have an opposing second end 906. The second end 906 may be movably connectable to the second antenna trace portion 504B via electrical connection 910 in a magnetized state of the cantilever member 902 to define the first position. For example, the cantilever member 902 may exhibit elongation (e.g., elastic deformation) if and when the cantilever member 902 is subjected to a magnetic field and/or the cantilever member 902 is in the first magnetized state. The elongation of the cantilever member 902 may move the second end 906 of the cantilever member 902 to the first position. For example, the second end 906 may move along path 912, at least caused by the deformation of the cantilever member 802, to establish a connection (e.g., electrical connection) between the first antenna trace portion 504A and the second antenna trace portion 504B. In some aspects, the cantilever member 902 may be moved to the first position upon application of a magnetic field in a particular direction. For example, the cantilever member 902 may be moved to the first position by applying a magnetic field in a direction that is parallel to the axis of motion. The first position of the deactivatable link 900 may enable the RFID chip 502 to transmit and/or receive wireless signals via the antenna 504. That is, the magnetically-actuatable switch may be in a closed position if and when the cantilever member 902 is magnetized.

The cantilever member 902 may retract in a second or demagnetized state of the cantilever member 902 to disconnect the second end 906 from the second antenna trace portion 504B to define the second position. For example, the second end 906 may move along path 912 to break the connection between the first antenna trace portion 504A and the second antenna trace portion 504B. In some aspects, the cantilever member 902 may be retract if and when the cantilever member 902 is demagnetized and/or the cantilever member 902 is subjected to another magnetic field. That is, the cantilever member 902 may exhibit contraction if and when demagnetized and/or subjected to another magnetic field. In some aspects, the cantilever member 902 may be moved to the second position upon application of a magnetic field in a different direction. For example, the cantilever member 902 may be moved to the second position by applying a magnetic field in a direction that is perpendicular to the axis of motion. The second position of the deactivatable link 900 may disable the RFID chip 502 from transmitting and/or receiving wireless signals via the antenna 504. That is, the magnetically-actuatable switch may be in an open position if and when the cantilever member 902 is the second magnetized state or the demagnetized state.

The cantilever member 902 may remain in its current position if and when the magnetic field is no longer applied. Alternatively or additionally, the elongation of the cantilever member 902 may be reversible or may be permanent. That is, the position of the cantilever member 902 may be or may not be subsequently changed by a subsequent application of another magnetic field. In some aspects, a cantilever form factor may be determined based at least on an elongation characteristic of a resulting cantilever member 802.

Figure 10:
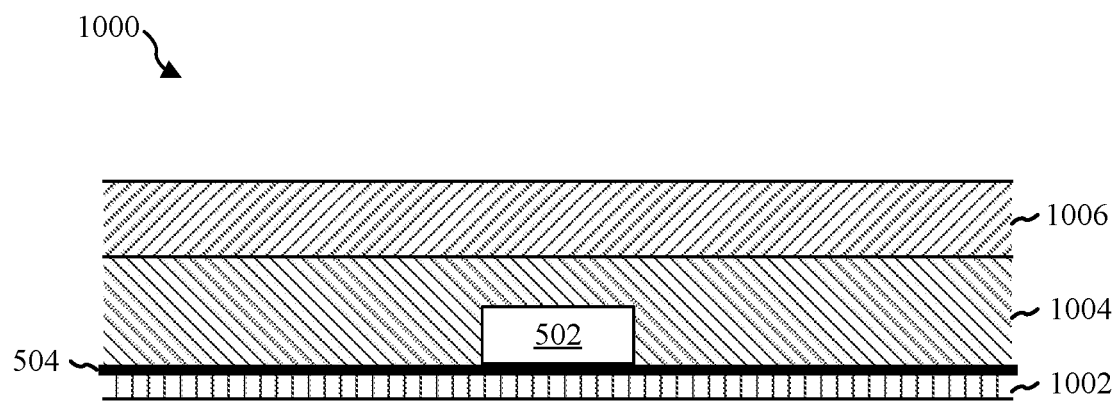
FIG. 10 is a diagram illustrating another example architecture for an RFID tag with a deactivatable link, in accordance with various aspects of the present disclosure.

Referring to FIG. 10, the diagram illustrates another example architecture for an RFID tag 1000. RFID tags 112$_1$-112$_N$, 118$_1$-118$_X$, tag 200, and RFID tag 500 are the same as or similar to RFID tag 1000. As such, the discussion of RFID tag 1000 is sufficient for understanding the RFID tags 112$_1$-112$_N$, 118$_1$-118$_X$ of FIG. 1, the tag 200 of FIG. 2, and the RFID tag 500 of FIG. 5. Notably, the RFID tag 1000 may include more or less components than those shown in FIG. 10. However, the components shown are sufficient to disclose an illustrative aspect implementing the present solution. The hardware architecture of FIG. 10 represents another aspect of a representative tag configured to deactivate an RFID tag by deactivating a link between an RFID chip and an antenna.

The RFID tag 1000 may comprise a circuit board or a flexible substrate (e.g., polyethylene terephthalate ("PET")) 1002, an RFID chip 502, an antenna 504, a magnetic or dielectric layer 1006 disposed on the circuit board 1002, and a field modulated layer 1004 disposed on the circuit board 1002. An electrically conductive trace formed on the circuit board 1002 may be configured to define the antenna 504. The RFID chip 502 may be mounted on the circuit board 1002 and may be electrically coupled to the antenna 504. The RFID chip 502 may be configured to transmit and/or receive a wireless signal via the antenna 504.

The field modulated layer 1004 may have a first property and a second property. The first property may interact with the magnetic or dielectric layer 1006 and the antenna 504 to enable the RFID chip 502 to transmit and/or receive the wireless signal. The second property may interact with the magnetic or dielectric layer 1006 and the antenna 504 to disable the RFID chip 502 to transmit and/or receive the wireless signal.

A frequency response of the RFID tag 1000 may be affected by a change in a property of the field modulated layer 1004. That is, the frequency response may be affected by a change in a conductivity property, a permittivity property, and/or a permeability property of the field modulated layer 1004. For example, the field modulated layer 1004 may be configured, if and when induced by a magnetic field, to vary at least one of a conductivity property, a permittivity property, and/or a permeability property. The field modulated layer 1004 may be configured, if and when the field modulated layer 1004 has the first property, to provide a first frequency response that enables the RFID chip 502 to transmit and/or receive the wireless signal. Alternatively or additionally, the field modulated layer 1004 may be configured, if and when the field modulated layer 1004 has the second property, to provide a second frequency response that disables the RFID chip 502 from transmitting and/or receiving the wireless signal.

The magnet or dielectric layer 1006 may maintain a magnetic or electric field to the field modulated layer 1004. The magnetic or electric field from the magnet or dielectric layer 1006 may induce the field modulated layer 1004 to have the first property or the second property. That is, the field modulated layer 1004 may have varying conductivity, permittivity, and/or permeability properties according at least to a magnetic and/or polarization state of the magnet or dielectric layer 1006.

For example, the first property of the field modulated layer 1004 may correspond to a magnetized state of the magnet or a polarized state of the dielectric layer 1006. That is, the field modulated layer 1004 may enable the RFID chip 502 and the antenna 504 to transmit and/or receive the wireless signal if and when the magnet or dielectric layer 1006 is in the magnetized state or the polarized state. Alternatively or additionally, the second property of the field modulated layer 1004 may correspond to a demagnetized state of the magnet or an unpolarized state of the dielectric layer 1006. That is, the field modulated layer 1004 may disable the RFID chip 502 and the antenna 504 to transmit and/or receive the wireless signal if and when the magnet or dielectric layer 1006 is in the demagnetized state or the unpolarized state.

In another example, the first property of the field modulated layer 1004 may correspond to the demagnetized state of the magnet or the unpolarized state of the dielectric layer 1006. That is, the field modulated layer 1004 may enable the RFID chip 502 and the antenna 504 to transmit and/or receive the wireless signal if and when the magnet or dielectric layer 1006 is in the demagnetized state or the unpolarized state. Alternatively or additionally, the second property of the field modulated layer 1004 may correspond to the magnetized state of the magnet or the polarized state of the dielectric layer 1006. That is, the field modulated layer 1004 may disable the RFID chip 502 and the antenna 504 to transmit and/or receive the wireless signal if and when the magnet or dielectric layer 1006 is in the magnetized state or the polarized state.

In some aspects, the magnet or dielectric layer 1006 and the field modulated layer 1004 may be incorporated into a substrate (not shown) of the RFID tag 1000 using printing, deposition, mechanical placement, and/or other attachment techniques.

In other aspects, the field modulated layer 1004 may be disposed on only a portion of the surface of the circuit board 1002. That is, the field modulated layer 1004 may be limited to a region of the circuit board 1002 that is most sensitive to the property change (e.g., conductivity, dielectric, permittivity, and/or permeability) of the field modulated layer 1004.

Continuing to refer to FIG. 10, the figure illustrates just one example of the magnet or dielectric layer 1006 and the field modulated layer 1004 that may be used by an RFID tag 1000. Those of skill in the art will appreciate that the specific architecture of the RFID tag 1000 may vary, and is secondary to the functionality that is provided, as further described herein. For example, the magnet or dielectric layer 1006 and the field modulated layer 1004 may be combined into a single layer. Alternatively or additionally, the magnet or dielectric layer 1006 may have similar functionality as the field modulated layer 1004. In another example, the antenna 504 may comprise magnetic and/or dielectric material. That is, the antenna 504 may provide the functionality described above in relation to the magnet or dielectric layer 1006 and/or the field modulated layer 1004.

Figure 11:
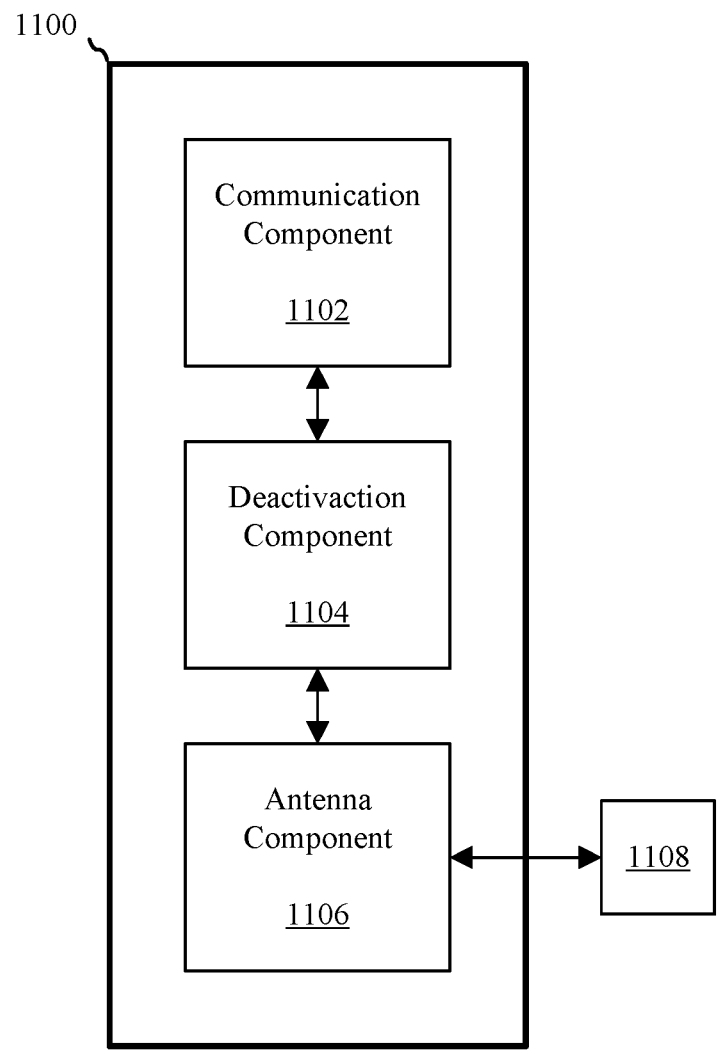
FIG. 11 is a diagram illustrating an example apparatus, such as an EAS tag, with a deactivatable link, in accordance with various aspects of the present disclosure.

FIG. 11 is a block diagram of an example apparatus 1100 apparatus with a deactivatable link. The apparatus 1100 may be an EAS tag (e.g., RFID tags 112$_1$-112$_N$, 118$_1$-118$_X$ of FIG. 1, tag 200 of FIG. 2, RFID tag 500 of FIG. 5, and RFID tag 1000 of FIG. 10) or an EAS tag may include the apparatus 1100. In some aspects, the apparatus 1100 may include a communication component 1102 configured to generate and transmit signals for tracking an item, an antenna component 1106 for receiving and transmitting wireless signals for the communication component 1102, and a deactivation component 1104 for electrically coupling or decoupling the communication component 1102 and the antenna component 1106 to selectively deactivate the apparatus 1100, and which may be in communication with one another (for example, via one or more electrical connections). As shown, the apparatus 1100 may communicate with another apparatus 1108 (such as an EAS tag reader, or another wireless communication device) using the communication component 1102 and the antenna component 1106.

In some aspects, the apparatus 1100 may be configured to perform one or more operations described herein in connection with FIGS. 5-10. Additionally or alternatively, the apparatus 1100 may be configured to perform one or more processes described herein, such as method 1200 of FIG. 12. In some aspects, the apparatus 1100 may include one or more components of the EAS tags described above in connection with FIGS. 1-2,5, and 10.

The communication component 1102 may transmit and receive communications, such as reference signals, control information, data communications, or a combination thereof, to and from the apparatus 1108 via the antenna component 1106 and the deactivation component 1104. In some aspects, the communication component 1102 may perform signal processing on the communications (such as filtering, amplification, (de)modulation, (de)multiplexing, (de)interleaving, (de)mapping, among other examples). In other aspects, the communication component 1102 may include one or more antennas, an RFID chip, a communication enabled device, or a combination thereof, of the EAS tags described above in connection with FIGS. 1-2,5, and 10.

The deactivation component 1104 may, in a first state, enable the communication component 1102 to transmit and/or receive communications via the antenna component 1106. The deactivation component 1104 may, in a second state, disable the communication component 1102 from transmitting and/or receiving communications via the antenna component 1106. In some aspects, the deactivation component 1104 may electrically couple, in the first state, the communication component 1102 and the antenna component 1106, and may electrically decouple, in the second state, the communication component 1102 and the antenna component 1106. In other aspects, the deactivation component 1104 may have a first property that corresponds to the first state that enables the communication component 1102 to transmit and/or receive communications via the antenna component 1106, and may have second property that corresponds to the second state that disables the communication component 1102 to transmit and/or receive communications via the antenna component 1106. The deactivation component 1104 may include one or more of the deactivatable links, or a combination thereof, of the deactivatable links described above in connection with FIGS. 5-10.

The antenna component 1106 may receive communications from the apparatus 1108 and provide the received communications to one or more other components of the apparatus 1100, such as the communication component 1102. The antenna component 1106 may transmit communications from the communication component to the apparatus 1108. In some aspects, the antenna component 1106 may include one or more antennas of the EAS tags described above in connection with FIGS. 2 and 5.

Figure 12:
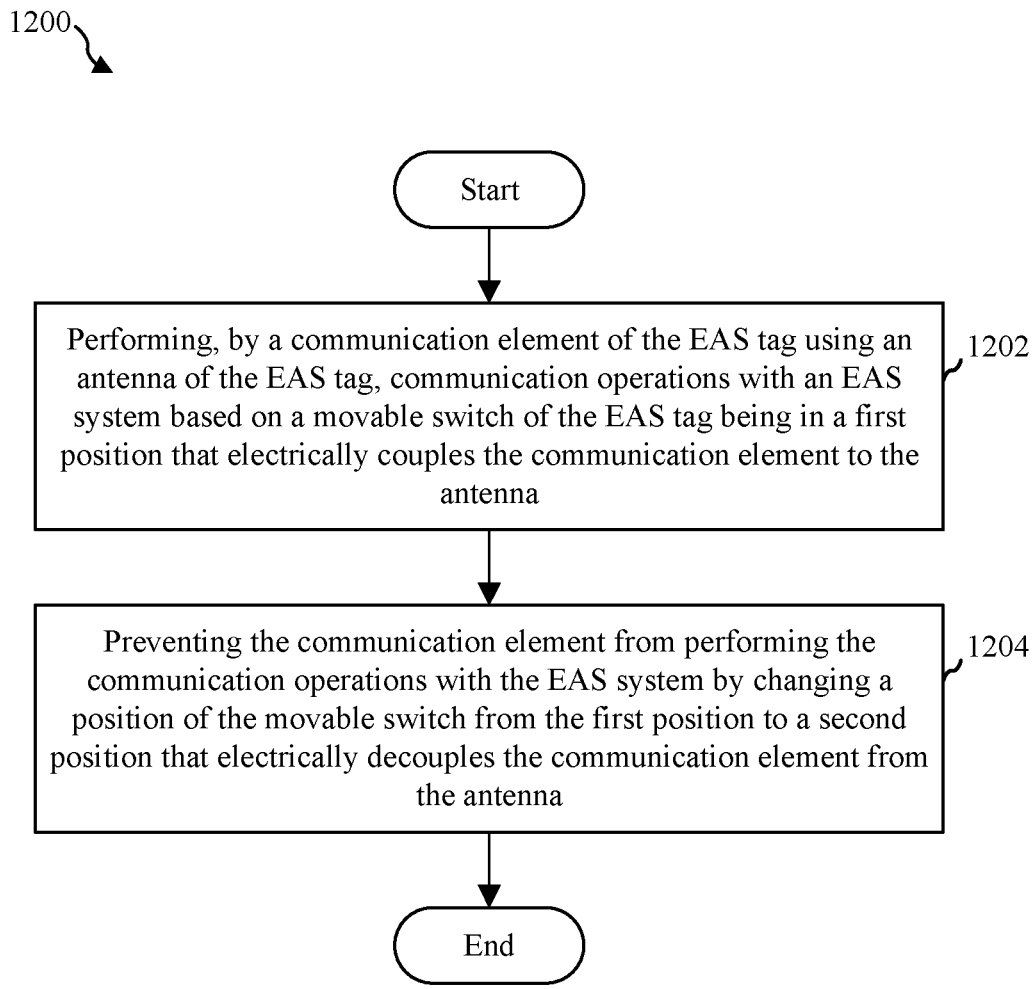
FIG. 12 is a flowchart of an example method for operating an EAS tag, in accordance with various aspects of the present disclosure.

Referring to FIG. 12, in operation, an EAS tag may perform a method 1200 of operating an EAS tag. The method 1200 may be performed by the RFID tags 112 (which may be the entire RFID tag 112 or a component of the RFID tag 112 such as the communication device 206, the RFID chip 502, or the deactivation link 506). The method 1200 may be performed by the communication component 1102 in communication with EAS tag reader 120.

In block 1202 of FIG. 12, the method 1200 may include performing, by a communication element of the EAS tag using an antenna of the EAS tag, communication operations with an EAS system based on a movable switch of the EAS tag being in a first position that electrically couples the communication element to the antenna. For example, in an aspect, the RFID tag 112, the RFID chip 502, and/or the deactivation link 506 may be configured to or may comprise means for performing, by a communication element 206 of the RFID tag 112 using an antenna 504 of the RFID tag 112, communication operations with an EAS system 100 based on a movable switch 506 of the RFID tag 112 being in a first position that electrically couples the communication element 206 to the antenna 504.

For example, the performing in block 1202 may include the movable switch of the deactivation link 506 being in a first position, corresponding to a first state, which electrically couples the communication element 206 of the RFID tag 112 to the antenna 504. The movable switch of the deactivation link 506 may be in the first position based at least on a portion of the deactivation link 506 being in a magnetized state.

Further, for example, the performing in block 1202 may be performed to facilitate registration, identification, and location and/or tracking of an item (e.g., article 110 or 112 of FIG. 1) to which the RFID tag 112 is coupled.

In block 1204, the method 1200 may include preventing the communication element from performing the communication operations with the EAS system by changing a position of the movable switch from the first position to a second position that electrically decouples the communication element from the antenna. For example, in an aspect, the RFID tag 112, the RFID chip 502, and/or the deactivation link 506 may be configured to or may comprise means for preventing the communication element 206 from performing the communication operations with the EAS system 100 by changing a position of the movable switch 506 from the first position to a second position that electrically decouples the communication element 206 from the antenna 504.

For example, the preventing in block 1204 may include the movable switch of the deactivation link 506 being in a second position, corresponding to a second state, which electrically decouples the communication element 206 of the RFID tag 112 from the antenna 504. The movable switch of the deactivation link 506 may be in the second position based at least on a portion of the deactivation link 506 being in a demagnetized state.

Further, for example, the preventing in block 1204 may be performed in response to a determination that the item (e.g., article 110 or 112 of FIG. 1) to which the RFID tag 112 is coupled has been authorized for removal from the premise (e.g., retail store facility).

In an alternative or additional aspect, the method 1200 may include subsequently changing the position of the movable switch from the second position to the first position to enable performing, by the communication element using the antenna, other communication operations with the EAS system. For example, in an aspect, the RFID tag 112, the RFID chip 502, and/or the deactivation link 506 may be configured to or may comprise means for changing the position of the movable switch 506 from the second position to the first position to enable performing, by the communication element 206 using the antenna 504, other communication operations with the EAS system 100. Further, for example, the changing may be performed to re-activate the RFID tag 112 so as to facilitate registration, identification, and location and/or tracking of an item (e.g., article 110 or 112 of FIG. 1) to which the RFID tag 112 is coupled.

In an alternative or additional aspect, the method 1200 may include having at least a portion of the movable switch be in a demagnetized state in the first position and in a magnetized state in the second position. For example, in an aspect, the RFID tag 112, the RFID chip 502, and/or the deactivation link 506 may be configured to or may comprise means for having at least a portion of the movable switch 506 be in a demagnetized state in the first position and in a magnetized state in the second position.

In an alternative or additional aspect, the method 1200 may include the movable switch comprising a magnetically-actuatable switch and changing the position of the switch from the first position to the second position, in response to a magnetic field being applied to the EAS tag. For example, in an aspect, the RFID tag 112, the RFID chip 502, and/or the deactivation link 506 may be configured to or may comprise means for the movable switch 506 comprising a magnetically-actuatable switch and changing the position of the switch 506 from the first position to the second position, in response to a magnetic field being applied to the RFID tag 112. Further, for example, the changing may be performed to deactivate the RFID tag 112, by disabling the RFID chip 502 from transmitting and/or receiving wireless signals via the antenna 504, so as to prevent registration, identification, and location and/or tracking of an item to which the RFID tag 112 is coupled.

In an alternative or additional aspect, the method 1200 may include the movable switch comprising a magnetically-actuatable switch that comprises a ferrofluid. For example, in an aspect, the RFID tag 112, the RFID chip 502, and/or the deactivation link 506 may be configured to or may comprise means for the movable switch 506 comprising a magnetically-actuatable switch that comprises the ferrofluid.

In an alternative or additional aspect, the method 1200 may include the movable switch comprising a magnetically-actuatable switch that comprises a Reed switch. The Reed switch may comprise at least one of a control element and a switching element, the control element or the switching element comprising a bias magnet (e.g., acousto-magnetic bias). For example, in an aspect, the RFID tag 112, the RFID chip 502, and/or the deactivation link 506 may be configured to or may comprise means for the movable switch 506 comprising a magnetically-actuatable switch that comprises a Reed switch that comprises at least one of a control element and a switching element, the control element or the switching element comprising a bias magnet (e.g., acousto-magnetic bias).

In an alternative or additional aspect, the method 1200 may include the movable switch comprising a magnetically-actuatable switch and moving a cantilever of the magnetically-actuatable switch based on a magnetization state of a magnetizable ferromagnetic element of the magnetically-actuatable switch. For example, in an aspect, the RFID tag 112, the RFID chip 502, and/or the deactivation link 506 may be configured to or may comprise means for the movable switch 506 comprising a magnetically-actuatable switch and moving a cantilever (e.g., 620, 720) of the magnetically-actuatable switch based on a magnetization state of a magnetizable ferromagnetic element (e.g., 620, 740) of the magnetically-actuatable switch. Further, for example, the moving may be performed to selectively activate or deactivate the RFID tag 112.

In an alternative or additional aspect, the method 1200 may include the movable switch comprising a magnetically-actuatable switch and moving a cantilever of the magnetically-actuatable switch based on a magnetic field applied to a MSMA element of the magnetically-actuatable switch. For example, in an aspect, the RFID tag 112, the RFID chip 502, and/or the deactivation link 506 may be configured to or may comprise means for the movable switch 506 comprising a magnetically-actuatable switch and moving a cantilever (e.g., 802, 902) of the magnetically-actuatable switch based on a magnetic field applied to a MSMA element (e.g., 802, 902) of the magnetically-actuatable switch. Further, for example, the moving may be performed to selectively activate or deactivate the RFID tag 112.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An electronic article surveillance ("EAS") tag, comprising:
   an antenna comprising a first antenna trace portion and a second antenna trace portion;
   a radio frequency identification ("RFID") chip configured to transmit and/or receive a wireless signal via the antenna; and a magnetically-actuatable switch configured to move between a first position and a second position, wherein the switch is configured to electrically couple the RFID chip to the antenna in the first position, and wherein the switch is configured to electrically decouple the RFID chip from the antenna in the second position, wherein the switch is disposed between the first antenna trace portion and the second antenna trace portion.

2. The EAS tag of claim 1, wherein the switch comprises a magnetizable ferromagnetic element configured to move the switch between the first position and the second position based on a magnetization state of the magnetizable ferromagnetic element.

3. The EAS tag of claim 1, wherein the switch comprises a magnetic shape memory alloy ("MSMA") element configured to move the switch between the first position and the second position based on a magnetic field applied to the MSMA element.

4. The EAS tag of claim 1, wherein the switch comprises a ferrofluid element configured to move the switch between the first position and the second position based on a magnetic field applied to the ferrofluid element.

5. The EAS tag of claim 1, wherein the switch comprises a Reed switch, wherein the Reed switch comprises at least one of a control element and a switching element, the control element or the switching element comprising a magnetic bias.

6. The EAS tag of claim 1, wherein at least a portion of the switch has a demagnetized state in the first position and a magnetized state in the second position.

7. The EAS tag of claim 1, wherein:
the switch comprises a first cantilever member formed from a magnetically soft ferromagnetic material and a second cantilever member formed from at least a magnetically semi-hard ferromagnetic material;
the first cantilever member having a first end connected to the first antenna trace portion and an opposing second end;
the second cantilever member having a third end connected to the second antenna trace portion and an opposing fourth end;
the fourth end is movably connectable to the second end in a magnetized state of the second cantilever member to define the first position; and
the fourth end is movably spaced apart from the second end in a demagnetized state of the second cantilever member to define the second position.

8. The EAS tag of claim 1, wherein:
the switch comprises a first cantilever member, a second cantilever member, and a magnetic ribbon member;
the first cantilever member and the second cantilever member are formed from a magnetically soft ferromagnetic material;
the magnetic ribbon member is formed from at least a magnetically semi-hard ferromagnetic material;
the first cantilever member having a first end connected to the first antenna trace portion and an opposing second end;
the second cantilever member having a third end connected to the second antenna trace portion and an opposing fourth end;
the fourth end is movably connectable to the second end in a magnetized state of the magnetic ribbon member to define the first position; and
the fourth end is movably spaced apart from the second end in a demagnetized state of the magnetic ribbon member to define the second position.

9. The EAS tag of claim 1, wherein:
the switch comprises a cantilever member formed from a magnetic shape memory alloy ("MSMA");
the cantilever member having a first end connected to the first antenna trace portion and an opposing second end;
the second end is movably connectable to the second antenna trace portion in a first magnetized state of the cantilever member to define the first position; and
the second end is movably spaced apart from the second antenna trace portion in a second magnetized state of the cantilever member to define the second position.

10. The EAS tag of claim 1, wherein:
the switch comprises a cantilever member formed from a magnetic shape memory alloy ("MSMA");
the cantilever member having a first end connected to the first antenna trace portion and an opposing second end;
the cantilever member elongates in a first magnetized state of the cantilever member to connect the second end to the second antenna trace portion to define the first position; and
the cantilever member retracts in a second magnetized state of the cantilever member to disconnect the second end from the second antenna trace portion to define the second position.

* * * * *